(12) United States Patent
Kin

(10) Patent No.: US 6,999,859 B2
(45) Date of Patent: Feb. 14, 2006

(54) VEHICLE SPEED MEASURING APPARATUS

(75) Inventor: Keiyu Kin, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 74 days.

(21) Appl. No.: 10/692,138

(22) Filed: Oct. 23, 2003

(65) Prior Publication Data

US 2004/0093128 A1    May 13, 2004

(30) Foreign Application Priority Data

Oct. 23, 2002    (JP) .............................. 2002-308302

(51) Int. Cl.
*B60C 23/06*    (2006.01)
*B60T 8/58*    (2006.01)

(52) U.S. Cl. .......................................... 701/1; 324/178
(58) Field of Classification Search .................... 701/1, 701/93; 324/178; 303/169, 173, 174, 194

See application file for complete search history.

(56) References Cited

U.S. PATENT DOCUMENTS

| | | | | |
|---|---|---|---|---|
| 4,961,643 A | * | 10/1990 | Sakai et al. | 356/28 |
| 5,301,130 A | * | 4/1994 | Alcone et al. | 702/141 |
| 5,557,552 A | * | 9/1996 | Naito et al. | 702/148 |
| 5,644,490 A | * | 7/1997 | Weber | 701/74 |
| 5,826,207 A | * | 10/1998 | Ohashi et al. | 701/36 |
| 6,142,026 A | * | 11/2000 | Ohashi et al. | 73/865.9 |

FOREIGN PATENT DOCUMENTS

| | | |
|---|---|---|
| JP | 2001-047998 | 2/2001 |
| WO | WO 97/10511 | * 3/1997 |

* cited by examiner

*Primary Examiner*—Michael J. Zanelli
(74) *Attorney, Agent, or Firm*—Carrier, Blackman & Associates, P.C.; Joseph P. Carrier; William D. Blackman

(57) ABSTRACT

A vehicle speed measuring apparatus includes front and rear wheel side vibration detection sensors for detecting vibrations from a road surface through tires, an input section through which the vibration detection sensors input their detection values, and a processing unit for calculating vehicle speed of the vehicle based on a change pattern of the detection values inputted. When the detection values are inputted through the input section, the processing unit feature extracts a change pattern of the detection values for the respective front and rear wheel sides by excluding inherent tire influences on the detection values, executes pattern matching between the front and rear wheel sides on the basis of the feature extracted change patterns of the detection values, and obtains a time difference from a coincidence of the change patterns, and thereafter calculates vehicle speed based on the time difference and a reference distance such as a wheel base.

17 Claims, 7 Drawing Sheets (a)

(b)

(c)

(a)

(b)

(c)

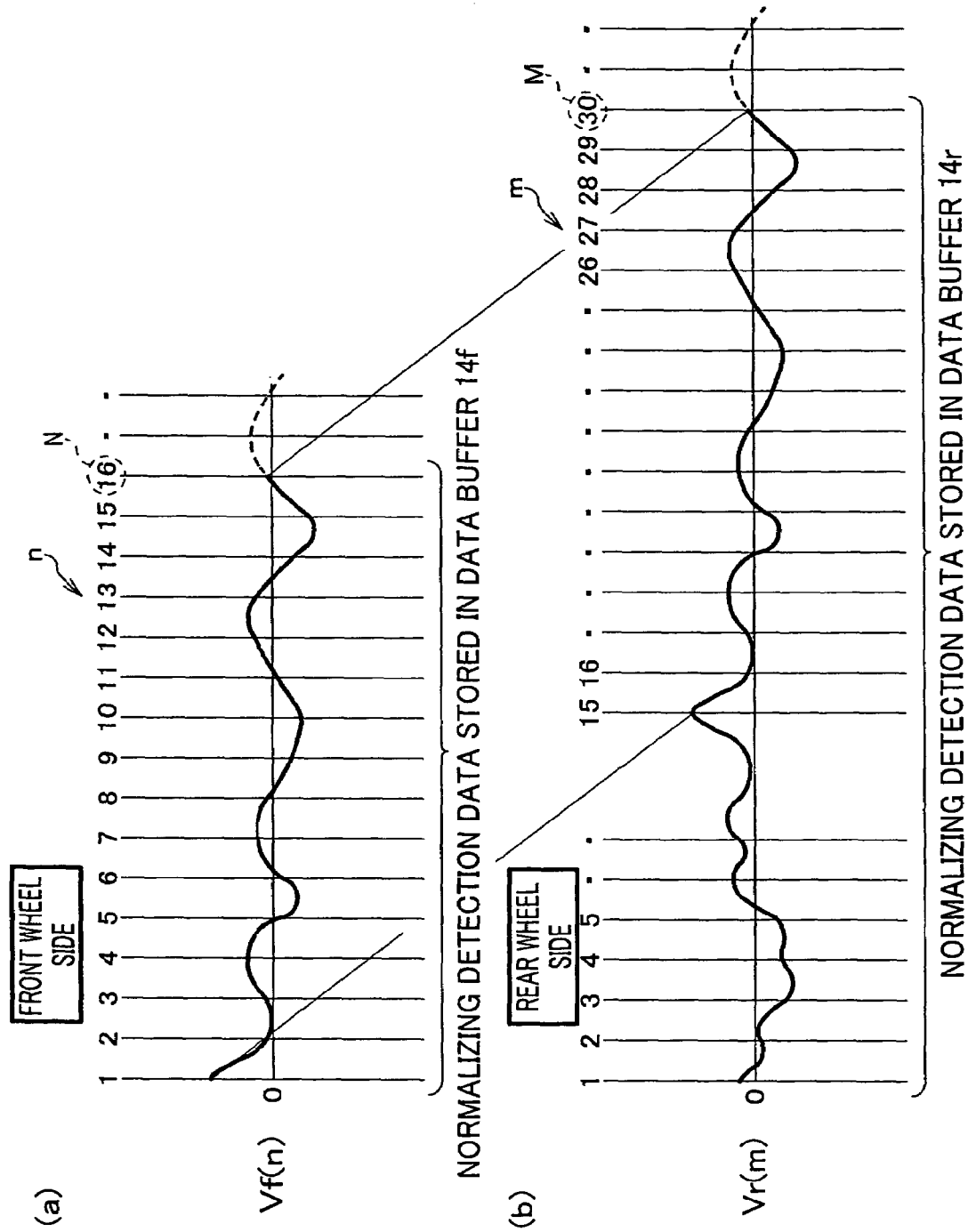

VEHICLE SPEED MEASURING APPARATUS

BACKGROUND OF THE INVENTION

1. Field of the Invention

The present invention relates to a vehicle speed measuring apparatus for measuring speed of a vehicle.

2. Discussion of Background Art

Vehicle speed is utilized for various controls of a vehicle. Generally, vehicle speed is measured by calculating detection values from wheel speed sensors. For example, in an antilock braking system which prevents wheel lock-up during braking or a vehicle behavior control apparatus, vehicle speed is measured by calculating detection values detected by wheel speed sensors. Japanese Laid-open Patent Application No. 2001-47998 (claims 2 and 3, columns 0031 and 0032, FIG. 5, etc.) discloses that vehicle speed is obtained by selecting the fastest wheel speed of four wheel speeds detected from the respective wheel sensors or by calculating the average wheel speed of the driven wheels.

However, a wheel speed sensor calculates wheel speed by counting the number of rotations of the tire (wheel) in a certain period of time. For this reason, in a case where the vehicle is equipped with deformed tires, or in a case where the tire inflation pressure has been changed, the tire diameter per se varies. This leads to a change in the wheel speed, and thus results in a change in the vehicle speed calculated from the wheel speed. The same can be said for a vehicle sensor which measures vehicle speed by detecting the rotational speed of the output shaft of the transmission, and a change in the tire diameter results in a change in the vehicle speed.

With the foregoing drawback of the art in view, the present invention mainly seeks to provide a vehicle speed measuring apparatus which can measure vehicle speed without being affected by a change in the tire diameter.

SUMMARY OF THE INVENTION

In recent years, extensive research and development work has been undertaken by the inventors based on findings that detection values of a vibration detection sensor (wheel speed sensor) change due to a level difference or a bump (roughness on the road surface), and that such a change first appears in the detection values at the front wheel sensors and then appears in the detection values at the rear wheel sensors if the vehicle runs in the advance direction. In this instance, if the changes in the detection values at the front and rear wheels are derived from the same level difference or bump, and if the time interval between the changes is obtained, vehicle speed can be obtained based on the wheel base (reference distance) of the vehicle without being affected by a change in the tire diameter. In this connection, the inventors have completed the present invention.

According to the present invention, a vehicle speed measuring apparatus includes vibration detection sensors for detecting vibrations from a road surface through tires, an input section through which the vibration detection sensors input their detection values, and a processing unit for calculating vehicle speed of the vehicle based on a change pattern of the detection values inputted. The vibration detection sensors are provided at a front wheel side and a rear wheel side, respectively. In the vehicle speed measuring apparatus, when the detection values are inputted through the input section, the processing unit in order operates to feature extract a change pattern of the detection values for the respective front and rear wheel sides by excluding inherent tire influences on the detection values, to execute pattern matching between the front and rear wheel sides on the basis of the feature extracted change patterns of the detection values, to obtain a time difference from a coincidence of the change patterns, and to calculate vehicle speed based on the time difference and a reference distance that is previously stored in the vehicle speed measuring apparatus.

The aforementioned vehicle speed measuring apparatus calculates vehicle speed in consideration of time required for a certain length of object (vehicle body) to pass over a point (a bump, etc.) on the road. In principle, this is different from the background art apparatus in which vehicle speed is calculated in consideration of the number of rotations of the tire per a certain length of time. Therefore, the vehicle speed measuring apparatus according to the present invention can measure vehicle speed without (substantially) being affected by a change in the tire diameter.

In the preferred embodiment to be described later, vehicle speed is measured based on a time difference between front and rear wheels to be detected by means of pattern matching, the purpose of which is to detect a change in detection values of the wheel speed at the front wheel side and to detect when the same change appears at the rear wheel side. However, vehicle speed may be measured by means of pattern matching between the rear wheel side and the front wheel side, during which are detected a change in detection values of the wheel speed at the rear wheel side and when the same change appeared previously at the front wheel side.

According to the present invention, the vibration detection sensors may be wheel speed sensors.

Detection values of a wheel speed sensor vary under the influence of a road bump, etc. Therefore, a wheel speed sensor may be employed as a vibration sensor. Because wheel speed sensors are generally known and in most cases mounted on a vehicle, there is no need to provide dedicated vibration detection sensors. Therefore, the vehicle speed measuring apparatus according to the present invention is cost effective and requires less layout space.

Other features and advantages of the present invention will be apparent from the following description taken in connection with the accompanying drawings.

BRIEF DESCRIPTION OF THE DRAWINGS

Preferred embodiments of the present invention will be described below, by way of example only, with reference to the accompanying drawings, in which:

FIGS. 3(a)–4(c) explains variations of detection values detected by wheel speed sensors;

FIGS. 4(a)–4(c) schematically explains the manner of measuring vehicle speed, wherein (a) illustrates an instance where the vehicle runs on a road including points a and b toward the point b, (b) illustrates in time sequence a change in detection values of the respective front and rear wheel speeds in the instance of (a), and (c) illustrates in time sequence changes in the detection values after being processed by digital filters;

FIG. 7(a), 7(b) schematically shows array variables, wherein (a) shows array variables Vf(n) to which a normalization process has been applied, and (b) shows array variables Vf(m) to which the normalization process has been applied.

INCORPORATION BY REFERENCE

The disclosure of the following priority application is hereby incorporated by reference into the detailed description of the invention:

Japanese Patent Application No.2002-308302 filed on Oct. 23, 2002.

DETAILED DESCRIPTION OF THE INVENTION

With reference to the accompanying drawings, a preferred embodiment of the present invention will be described.

Construction of Vehicle Speed Measuring Apparatus

Construction of a vehicle speed measuring apparatus 1 according to one preferred embodiment will be described in connection with a vehicle C.

Figure 1:
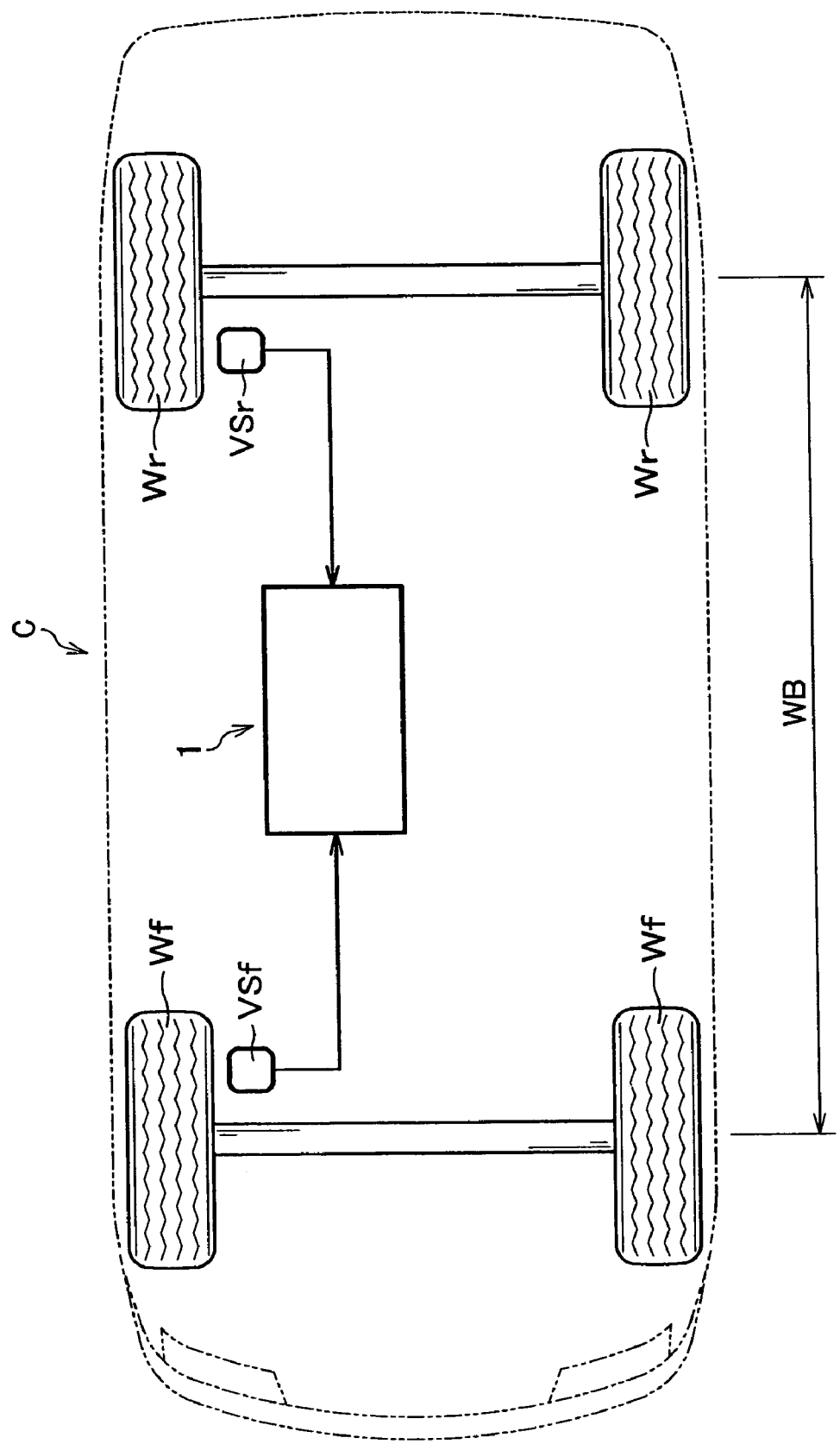
FIG. 1 is a system diagram of a vehicle equipped with a vehicle speed measuring apparatus according to the present invention.

As shown in FIG. 1, the vehicle C equipped with the vehicle speed measuring apparatus 1 is a four wheeled vehicle including two front wheels Wf and two rear wheels Wr. The vehicle C is provided with a wheel speed sensor VS (VSf, VSr) that is corresponding to a vibration detection sensor at a front right wheel Wf and a rear right wheel Wr, respectively. Subscripts f and r represent "front wheel side" and "rear wheel side", respectively.

The wheel speed sensor VS (VSf, VSr) is a generally known sensor which generates vehicle speed pulses, for example, by the use of a Hall element. In the vehicle speed pulse (analog electric signal) that is generated by the wheel speed sensor VSf, VSr and transmitted to the vehicle speed measuring apparatus 1, the number of pulses per a unit of time increases as the vehicle speed increases, and the number of pulses per a unit of time decreases as the vehicle speed decreases. In general, wheel speed or vehicle speed can be calculated based on the vehicle speed pulse. However, as previously described, wheel speed or vehicle speed calculated from the vehicle speed pulse changes in accordance with inflation pressure within the tire or type of the tire (outer diameter size) applied for the vehicle, and thus the obtained wheel speed or the obtained vehicle speed is not always accurate.

Vehicles equipped with an antilock braking system or a traction control system usually include wheel speed sensors VS, and these sensors can be used to calculate vehicle speed.

The vehicle speed measuring apparatus 1 includes a micro computer (not shown) and its peripheral circuits, so that the micro computer reads out a program written in a non-illustrated ROM and executes respective modules of the program (e.g., digital filters 12, normalization means 15, etc.) to calculate vehicle speed. Further, in order to measure vehicle speed, the vehicle speed measuring apparatus 1 includes an input/output port (input/output interface 11 to be described later) for inputting/outputting various signals, information, commands, etc., and a non-illustrated A/D converter for converting an analog signal to a digital signal so as to allow the micro computer to execute digital processing. The input/output port corresponds to the input section.

Figure 2:
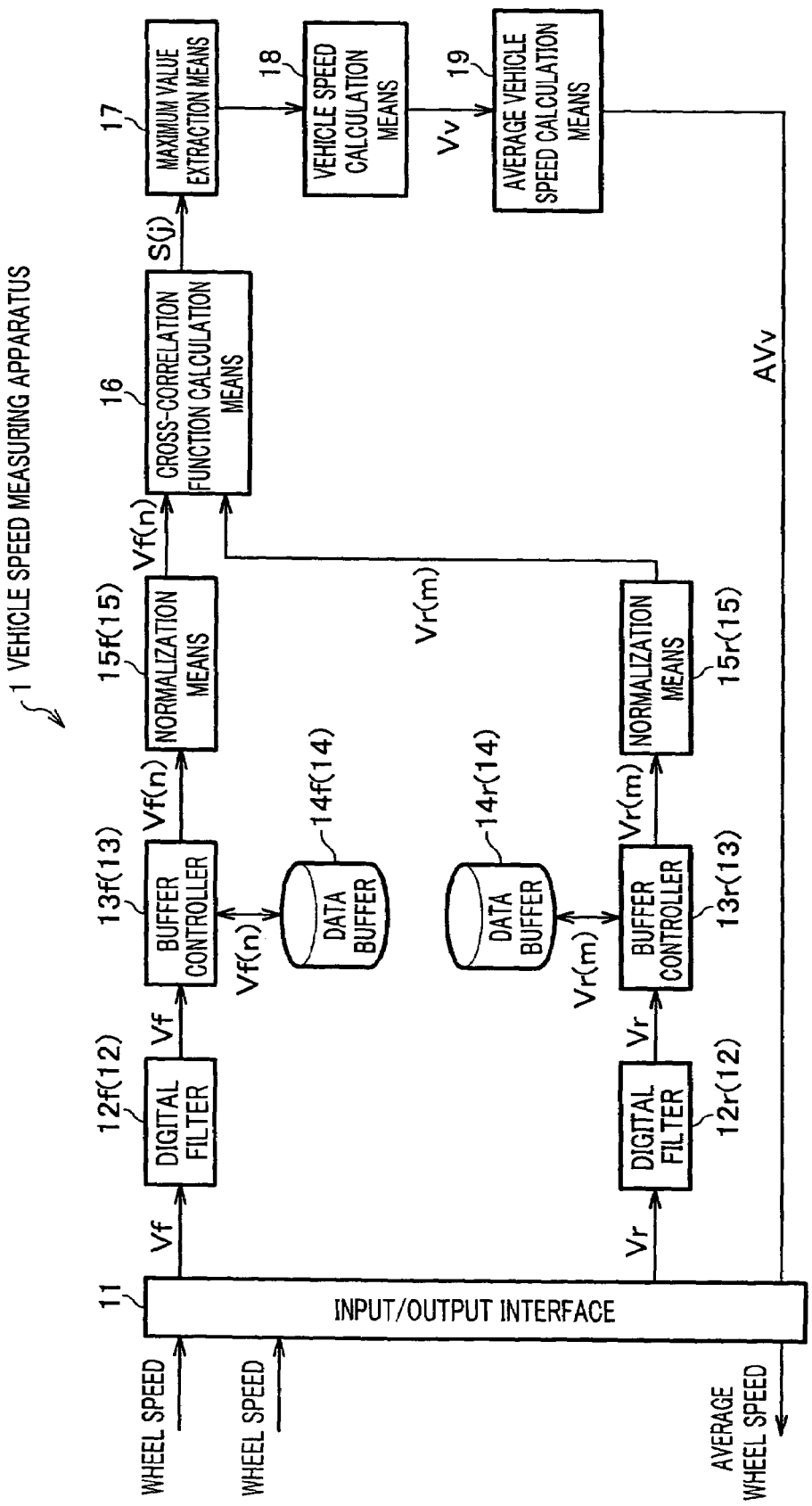
FIG. 2 is a block diagram illustrating a main part of the vehicle speed measuring apparatus.
Figure 3:
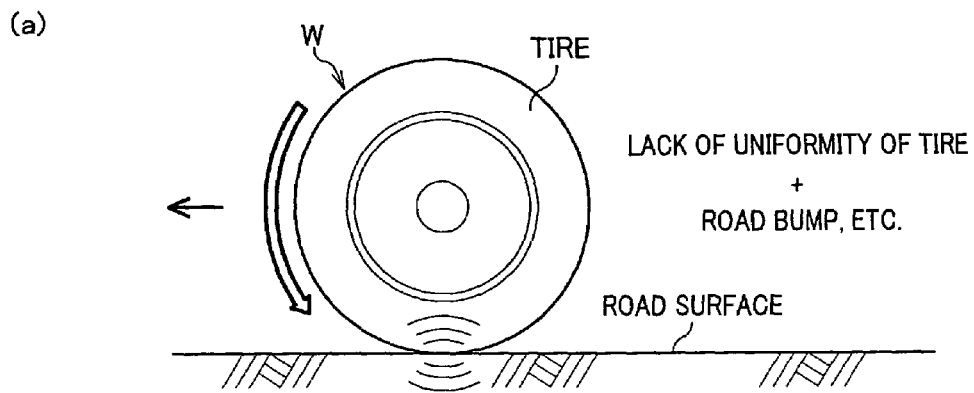
Figure 3:
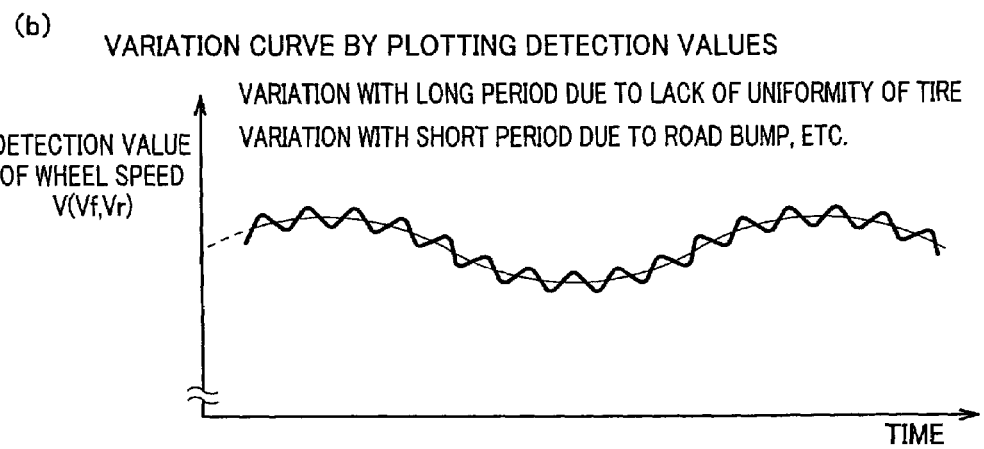
Figure 3:
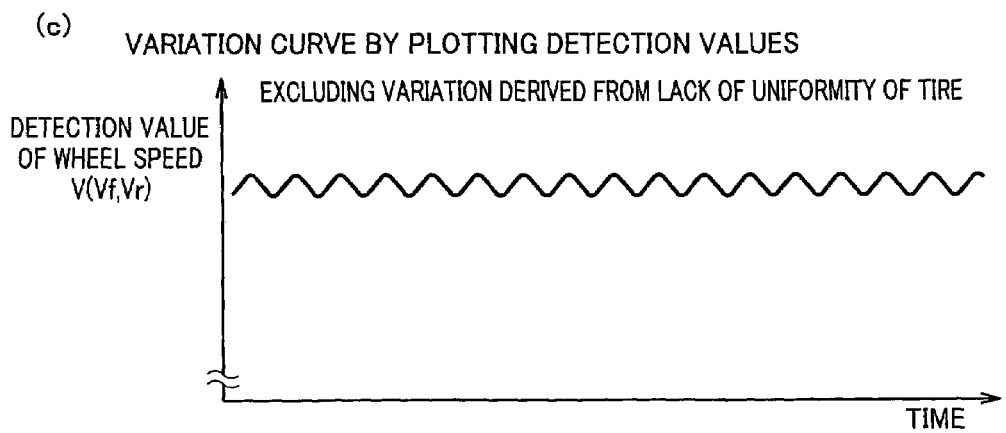
Figure 4:
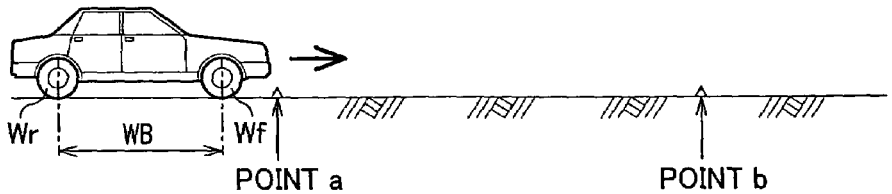
Figure 4:
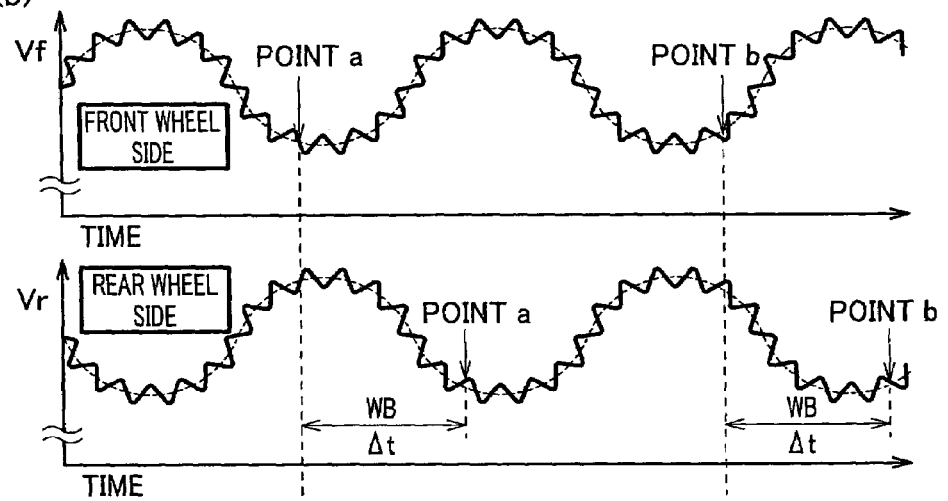
Figure 4:
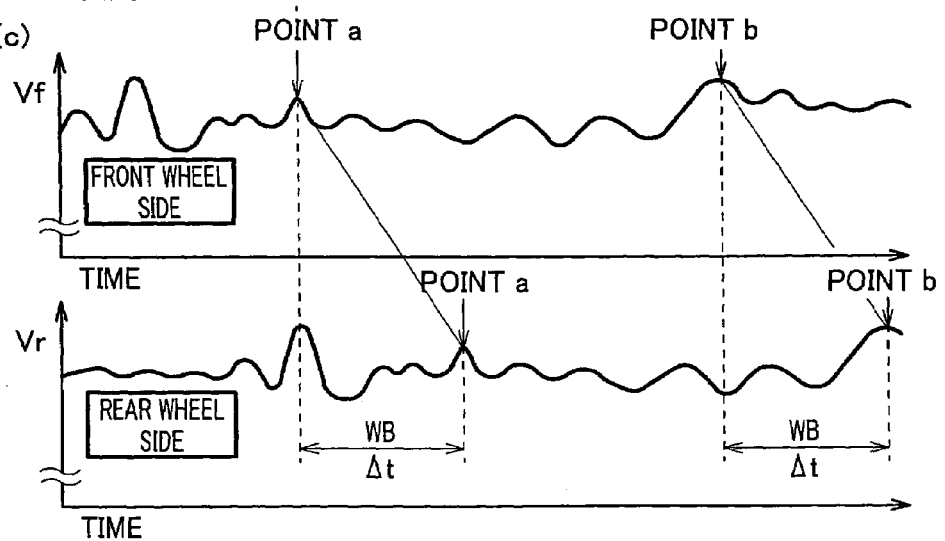

With reference to FIGS. 2 and 3, the vehicle speed measuring apparatus 1 will be described in detail.

As shown in FIG. 2, the vehicle speed measuring apparatus 1 mainly consists of an input/output interface 11, digital filters 12 (12f, 12r), buffer controllers 13 (13f, 13r), data buffers 14 (14f, 14r), normalization means 15 (15f, 15r), a cross-correlation function calculation means 16, a maximum value extraction means 17, a vehicle speed calculation means 18, and an average vehicle speed calculation means 19.

The input/output interface 11 functions to input data to be treated by the vehicle speed measuring apparatus 1 and to output data that have been processed by the vehicle speed measuring apparatus 1. In the vehicle speed measuring apparatus 1, wheel speed (detection values V (Vf, Vr)) represented by a digital data is treated as a vehicle speed pulse. In this preferred embodiment, sampling rate for wheel speed is 1000 Hz.

The digital filter 12 (12f, 12r) is a digital-type band pass filter which processes detection values V (Vf, Vr) of the wheel speed to be inputted one after another and which merely passes a component with a certain frequency. The reason why the digital filter merely permits a certain frequency is to remove variations of the wheel speed due to lack of uniformity of the tire and to extract wheel speed variations derived from a bump or level difference on the road surface (hereinafter referred to as "a road bump, etc.").

Because tires are produced by winding rubber, steal wires, etc., non-uniformity (lack of uniformity) exists on strength or density during one rotation of the tire. As best seen in FIG. 3(a), when wheel W rotates on the road surface, even if the vehicle C runs at a certain speed, a large variation occurs in time variations of detection values V (variation curve of wheel speed detection values) obtained by the wheel speed sensor VS (see FIG. 3(b)) due to unbalance of the tire (lack of uniformity). A variation with a short period that is derived from a road bump, etc., is superposed on this variation with a long period. Because the purpose of the present invention is to obtain an absolute vehicle speed from a wheel speed variation due to a road bump, etc., as shown in FIG. 3(c), the vehicle speed measuring apparatus 1 excludes a variation component resulting from the lack of uniformity of the tire by means of the digital filter 12 (i.e., excluding inherent tire influences on the detection values) to smoothly execute subsequent processes. As the wheel speed becomes faster, the period (frequency) of the wheel speed variation derived from the lack of uniformity of the tire and the period (frequency) of the wheel speed variation derived from the road bump, etc. become short as a whole (shift to higher frequency band). Therefore, the digital filter 12 is constructed such that as the wheel speed increases the wheel speed variation at higher frequency band passes through the digital filter 12.

The buffer controller 13 (13f, 13r) functions to obtain, at every 10 milliseconds, a detection value V (Vf, Vr) of the wheel speed that has passed through the digital filter 12 and to write a predetermined number of detection values in the data buffer 14 (14f, 14r). Further, the buffer controller 13 functions to read out the predetermined number of detection values from the data buffer 14. The data buffer 14 (14f, 14r) is a read/write memory for temporally storing the detection values V (Vf, Vr). Reading and writing the data can be performed through the buffer controller 13.

Detection values V (Vf, Vr) are stored in the data buffers 14f, 14r in association with process counters n, m which count the number of processes. To be more specific, detection values Vf for the front wheel side are stored in the data buffer 14f as array variables Vf(n) in association with the process counter n, and detection values Vr for the rear wheel side are stored in the data buffer 14r as array variables Vr(m) in association with the process counter m. Each of the process counters n, m is a counter (index) to increase the number one by one when one detection value V (Vf, Vr) is stored in the data buffer 14f, 14r. In this preferred embodiment, the process counter n can count the maximum of 16 detection values, and the process counter m can count the maximum of 30 detection values.

The predetermined number (final value N) is 16 (final value N=16) for the front wheel side buffer controller 13f. Meanwhile, the predetermined number (final value M) is 30 (final value M=30) for the rear wheel side buffer controller 13r. The reason for restricting the number of data to be stored in the data buffers 14f, 14r is to release a load required for the calculation process at the normalization means 15 or at the cross-correlation function calculation means 16. Also, even if the number of data is restricted, absolute vehicle speed Vv can be measured in a reliable manner. Although the initial value of each process counter n, m is 0, the process counter n, m actually counts the number starting from 1. Therefore, the process counter n takes a positive number substantially from 1 to 16, and the process counter m takes a positive number substantially from 1 to 30. The rear wheel side process counter m takes the final value M that is greater than the final value N of the front wheel side process counter n. This is because a change appearing at the front wheel side, such as a change of the detection value V upon passing over a bump, occurs at the rear wheel side with a certain time interval. In order to reliably store and detect the same change appearing at the rear wheel side, a sufficient number is set as the final value M.

In this preferred embodiment, the data buffer 14 receives the detection value V from the digital filter 12 at every 10 milliseconds. In this instance, if the detection value Vf is repeatedly stored in the array variable Vf(n) until the process counter n counts the final value of 16, the data buffer 14f stores detection values Vf corresponding to the actual time of 150 milliseconds (150 milliseconds=(16−1)×10 milliseconds). Likewise, if the detection value Vr is repeatedly stored in the array variable Vr(m) until the process counter m counts the final value of 30, the data buffer 14r stores detection values Vr corresponding to the actual time of 290 milliseconds (290 milliseconds=(30−1)×10 milliseconds).

In a case where the vehicle speed (wheel speed) is fast, the data sampling interval (sampling interval) preferably becomes short. In this instance, it is not necessary to store so many detection values V corresponding to a relatively long period of time. On the contrary, in a case where the vehicle speed is slow, it is necessary to store a large number of detection values V corresponding to a relatively long period of time. To be more specific, it is necessary to increase the final value M or to increase the sampling interval.

The normalization means 15 (15f, 15r) will be described below.

The front wheel side normalization means 15f functions to read out all the 16 array variables Vf(n) from the data buffer 14f through the buffer controller 13f. Further, in order to facilitate the subsequent process at the cross-correlation function calculation means 16, the front wheel side normalization means 15 functions to execute a normalization process by removing the vehicle speed component from the detection values Vf (=array variable Vf(n)). For this reason, the normalization means 15f processes to calculate the average wheel speed AVf from among the array variables Vf(1) to Vf(16). The average wheel speed AVf at the front wheel side is obtained by the following equation.

$$AVf = \Sigma Vf(n)/16 = (Vf(1)+Vf(2)+ \ldots +Vf(16))/16 \quad (1)$$

The front wheel side normalization means 15f executes a normalization process for the array variables Vf(n) by the following equation (2) and excludes the vehicle speed component (average wheel speed AVf).

$$Vf(n) = Vf(n) - AVf \quad (2)$$

Because the process counter n (area where the data is stored) takes a positive number from 1 to 16, the front wheel side normalization means 15f repeatedly calculates the equation (2) 16 times until the process counter n increases the number one by one and then takes the final value (N=16). Accordingly, normalized array variables Vf(1) to Vf(16) can be obtained.

According to this preferred embodiment, the same variable identifier Vf(n) is utilized for variables before and after the normalization process is applied to. This is for saving then umber of variable identifiers.

The rear wheel side normalization means 15r also executes a normalization process similar to the front wheel side normalization means 15f. To avoid duplication, description of the rear wheel side normalization means 15r will be omitted. The average wheel speed AVr at the rear wheel side is obtained by the following equation.

$$AVr = \Sigma Vr(m)/30 = (Vr(1)+Vr(2)+ \ldots +Vr(30))/30 \quad (3)$$

The rear wheel side normalization means 15r executes a normalization process by the following equation (4).

$$Vr(m) = Vr(m) - AVr \quad (4)$$

Because the process counter m takes a positive number from 1 to 30, the rear wheel side normalization means 15r repeatedly calculates the equation (4) 30 times until the process counter m increases the number one by one and then takes the final value (M=30). Accordingly, normalized array variables Vr(1) to Vr(30) can be obtained.

The cross-correlation function calculation means 16 calculates (executes) cross-correlation functions in a sort of Fourier transformation. Specifically, the cross-correlation function calculation means 16 processes to determine how (at which point) the change pattern derived from the road bump, etc. that has appeared at the front wheel Wf within 150 milliseconds appears at the rear wheel Wr within 290 milliseconds. Therefore, the cross-correlation function calculation means 16 receives the whole array variables Vf(n), Vr(m) that have been normalized by the normalization means 15 (15f, 15r), and executes the convolution shown by the following equations (5) through (19) (equations (8) to (18) are omitted).

$$S(1) = Vf(1) \cdot Vr(1) + Vf(2) \cdot Vr(2) + \ldots + Vf(16) \cdot Vr(16) \quad (16)$$

$$S(2) = Vf(1) \cdot Vr(2) + Vf(2) \cdot Vr(3) + \ldots + Vf(16) \cdot Vr(17) \quad (6)$$

$$S(3) = Vf(1) \cdot Vr(3) + Vf(2) \cdot Vr(4) + \ldots + Vf(16) \cdot Vr(18) \quad (7)$$

. . .

$$S(15) = Vf(1) \cdot Vr(15) + Vf(2) \cdot Vr(16) + \ldots + Vf(16) \cdot Vr(30) \quad (19)$$

Herein, S(1) to S(15) are expressed as S(j). S(j) is an array variable in which 15 calculation results (J=1 to 15) of the cross-correlation functions (convolution integration) are stored. Further, "j" indicates an index required to assign the data address.

Once the result data are written in the array variable S(j) by the result of calculating the cross-correlation functions, vehicle speed can be measured without any trouble even if new detection values V (Vf, Vr) are stored as the array variables Vf(n) Vr(m). For this reason, upon completing calculations of the cross-correlation functions, the cross-correlation function calculation means 16 reports the completion of the process (not shown) to the buffer controller 13 (13f, 13r). When the buffer controller 13 receives the process completion report, the buffer controller 13 resets the process counters n, m to zero so that new detection values V (Vf, Vr) are stored in the data buffers 14 as the array variables Vf(n), Vr(m). This can save the number of variable identifiers. Because less memory utilization is required, for example, increased number of data can be processed.

In a case where the variable identifiers of the array variables Vf(n), Vr(m) are changed and then read out from the data buffers 14f, 14r, upon completing the read-out of the array variables vf(n), Vr(m), new detection values Vf, Vr can be stored immediately as the array variables Vf(n), Vr(m) with the same variable identifiers. This can save the processing time.

The maximum value extraction means 17 calculates a function to extract the maximum value of the array variable S(j). To be more specific, the maximum value extraction means 17 extracts the maximum value from the array variable S(j), into which the results of the above convolution integration are assigned, by the following equation (20).

$$Ssim = \max\{S(1), S(2), S(3), \ldots, S(15)\} \quad (20)$$

The vehicle speed calculation means 18 processes to determine the time difference $\Delta t$ from the value of the index j, by which the array variable takes the maximum value, and also processes to calculate vehicle speed Vv by the following equations (21) and (22), based on the previously stored reference distance, such as the wheel base WB between the front wheel Wf and the rear wheel Wr of the vehicle C.

$$\Delta t[\text{sec}] = 10[\text{mil sec}]/1000[\text{mil sec/sec}] \times (j-1) \quad (21)$$

$$Vv[\text{km/hr}] = WB[\text{m}]/\Delta t[\text{sec}] \times 3600[\text{sec/hr}]/1000[\text{m/km}] \quad (22)$$

The time difference $\Delta t$ corresponds to the term "time difference from a coincidence of the change patterns". The value "10" appearing in the equation (21) indicates the sampling interval for each detection value Vf, Vr. The reason for subtracting 1 from the index j is to obtain the interval number.

The average vehicle speed calculation means 19 processes to calculate the average vehicle speed AVv from the vehicle speed Vv that is calculated by the vehicle speed calculation means 18. The average vehicle speed calculation means 19 includes FIFO (First In First Out) shown in FIG. 6. FIFO is a memory to carry out a first-in first-out operation. FIFO stores values of the vehicle speed Vv that have been calculated by the vehicle speed calculation means 18 and the number of which is K, as the array variable Vv(k). FIFO in order deletes the oldest array variable Vv(K) whenever vehicle speed Vv from the vehicle speed calculation means 18 is stored into FIFO, and increases 1 for the indexes k of the other array variables Vv(k), so that the array variable Vv(1) becomes the array variable Vv(2) and the array variable Vv(K-1) becomes the array variable Vv(K). Values of the vehicle speed Vv over a certain past period of time are in order renewed accordingly. Relation between the index k and its final value K is given by $1 \leq k \leq K$ (herein, K>1). The final value K is, for example, 5.

The average vehicle speed calculation means 19 reads out the array variables Vv(1) to Vv(5) from FIFO, and calculates the average vehicle speed AVv (i.e., measures vehicle speed) by the following equation (23).

$$AVv = \Sigma Vv(k)/K = (Vv(1) + Vv(2) + \ldots + Vv(K))/K \quad (23)$$

If the final value K of the index k is 5, because the final value M of the process counter m is 30 and the data interval of each detection value V (Vf, Vr) is 10 milliseconds, the average vehicle speed AVv is obtained by averaging vehicle speed of the vehicle C for 1.5 seconds (=30×10milliseconds×5). As previously described, the buffer controller 13 (13f, 13r) receives the detection value V (Vf, Vr) from the digital filter 12 at every 10 milliseconds, and stores it into the data buffer 14 (14f, 14r)

Because the average vehicle speed calculation means 19 includes FIFO, the average vehicle speed calculation means 19 calculates (measures) one average vehicle speed AVv when the vehicle speed calculation means 18 calculates one vehicle speed Vv. To save the variable identifier, the vehicle speed Vv calculated by the vehicle speed calculation means 18 and the average vehicle speed AVv calculated by the average vehicle speed calculation means 19 may be named by the same variable identifier Vv.

The average vehicle speed AVv that is calculated (measured) as above is utilized for various controls.

In this preferred embodiment, the processes carried out by the digital filter 12, the buffer controller 13, the data buffer 14, and the normalization means 15 are corresponding to "excluding inherent tire influences on the detection values" and "feature extracting". Further, the processes carried out by the cross-correlation function calculation means 16, the maximum value extraction means 17, and the vehicle speed calculation means 18 are corresponding to "pattern matching" and "calculating vehicle speed".

Operation of Vehicle Speed Measuring Apparatus

With reference to FIGS. 1 through 7, operation of the vehicle speed measuring apparatus according to this preferred embodiment will be described.

Excluding Variations Derived From Lack of Uniformity of Tire

As shown in FIG. 4(a), the vehicle C runs at a certain vehicle speed along the road including points a and b. When the vehicle C starts to move, detection values V (Vf, Vr) of the wheel speed are inputted from the wheel speed sensors VS (VSf, VSr) to the vehicle speed measuring apparatus 1 through the input/output interface 11. As described above, because of lack of uniformity of each tire at the front and rear wheels Wf, Wr, a variation with a long period due to the lack of uniformity and a variation with a short period due to a road bump, etc. are superposed on the detection values Vf, Vr detected by the wheel speed sensor VS (see FIG. 4(b)). Even if the vehicle C runs at a constant speed, the detection values Vf, Vr vary due to lack of uniformity of the tire and the influence of the road bump, etc. In this preferred embodiment, in order to measure vehicle speed based on a variation (change) of the wheel speed due to a road bump, etc, the digital filter 12 processes to exclude a variation derived from lack of uniformity of the tire from the detection values Vf, Vr.

FIG. 4(b) shows detection values Vf, Vr, in which the upper figure is for the front wheel side and the lower figure is for the rear wheel side. As shown in FIG. 4(b), a phase difference occurs in accordance with the wheel base WB of the vehicle C and the vehicle speed Vv. The front wheel Wf passes over the point a (point b), and thereafter the rear wheel Wr passes over the point a (point b). The same can be said for FIG. 4(c), in which the axis of ordinates is highlighted compared with FIG. 4(b).

As shown in FIG. 4(c), a variation derived form lack of uniformity of the tire can be excluded by the process of the digital filter 12. Therefore, it is possible to reliably measure (calculate) vehicle speed as an absolute speed.

Recording Detection Values in Data Buffer

The detection values Vf, Vr, from which the variation due to lack of uniformity of the tire has been excluded by the digital filter 12, are transmitted to the buffer controller 13 at every 10 milliseconds. Thereafter, the detection values Vf, Vr are stored in the data buffers 14f, 14r as array variables vf(n), Vr(m).

Figure 5:
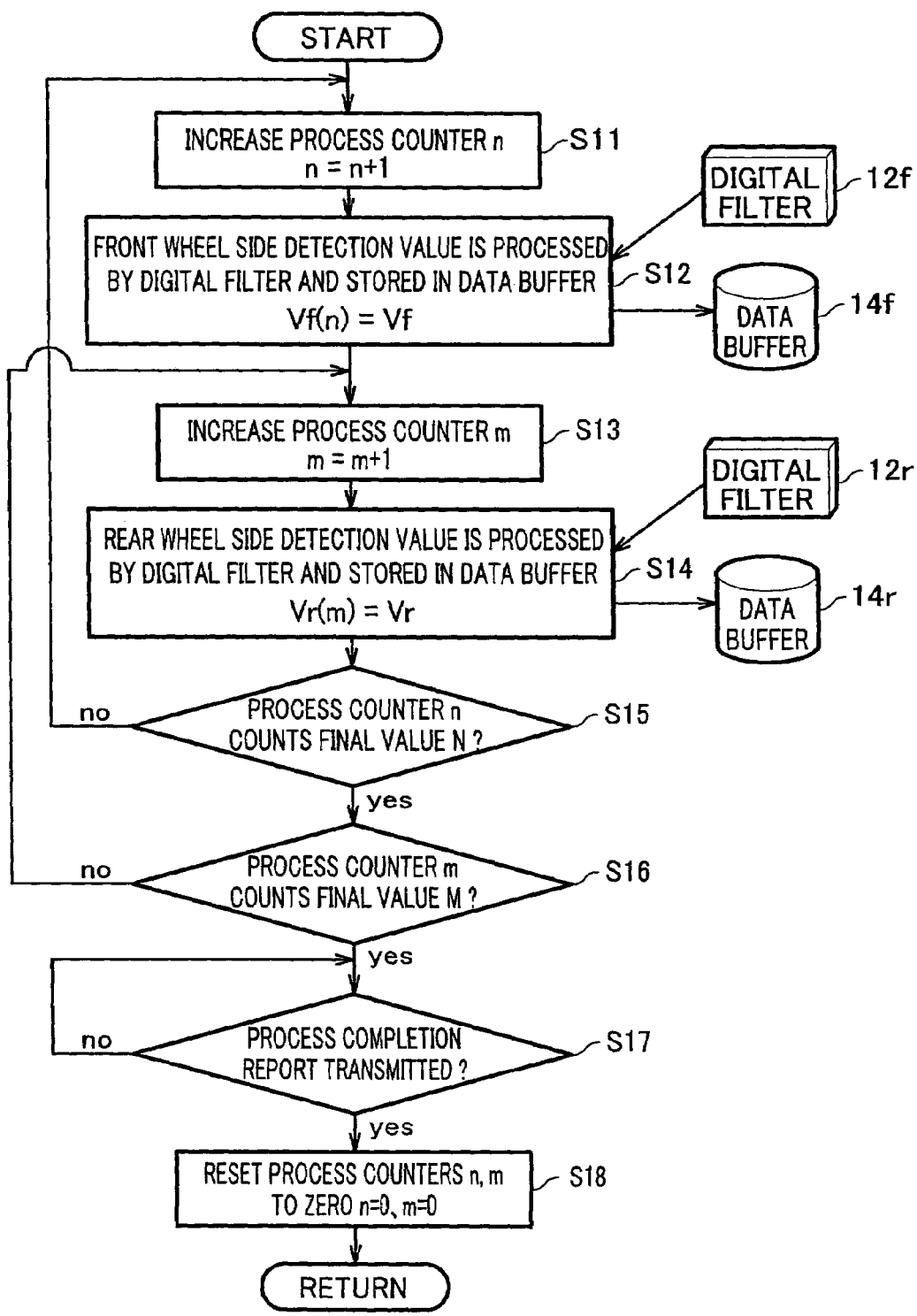
FIG. 5 is a flow chart showing operations for storing detection values into data buffers.

As seen in FIG. 5, the process counters n, m are initially set to zero. Upon storing the detection values V (Vf, Vr) into the data buffers 14f, 14r, the process counters n, m increase the number of processes. Specifically, the process counter n provided at the front wheel side increases the number of processes (S11). Then, the detection value Vf, to which the digital filter 12f has applied the process, is transmitted at every 10 milliseconds and stored in the data buffer 14f as the array variable Vf(n) (S12). Similar processes are carried out at the rear wheel side, wherein steps S13, S14 correspond to steps S11, S12, respectively.

When the detection value Vr is stored in the data buffer 14r as the array variable Vr(m), the buffer controller 13 detects whether the process counter n counts the final value N (S15). If the process counter n does not counts the final value N (no), operation returns to step S1 and repeats the above processes. Therefore, detection values Vf, Vr are gradually stored in the data buffers 14f, 14r as the array variables Vf(n), Vr(m).

Meanwhile, if the process counter n counts the final value N (yes) in step S15, that is, if the process counter n counts 16 in this preferred embodiment, a determination is made as to whether the process counter m counts the final value M (S16).

If the process counter m does not count the final value M in step S16, operation then returns to step S13. In this event, after increasing the process counter m, the data buffer 14r stores the detection values Vr, to which the digital filter 12 provided at the rear wheel side has applied the process, as the array variables Vr(m) (S14). Thereafter, the process in step S16 is repeated via step S15. The detection value Vr is repeatedly stored only in the rear wheel side data buffer 14r as the array variable Vr(m).

Meanwhile, if the process counter m counts the final value M (yes) in step S16, that is, if the process counter m counts 30 in this preferred embodiment, a determination is made as to whether the cross-correlation function calculation means 16 has transmitted the process completion report (S17). If the cross-correlation function calculation means 16 has not transmitted the process completion report, the buffer controller 13 waits for the report. When the cross-correlation function calculation means 16 transmits the process completion report to the buffer controller 13 (yes), the buffer controller 13 resets (clears) the process counters n, m to zero (S18). Operation then proceeds to RETURN (continues the process).

As a result, 16 detection values Vf are stored in order at every 10 milliseconds as the array variables Vf(n), and 30 detection values Vr are stored in order as the array variables Vr(m). Therefore, the preparation for the subsequent process (calculation process for the average vehicle speed) is completed.

Calculating Average Vehicle Speed

Figure 6:
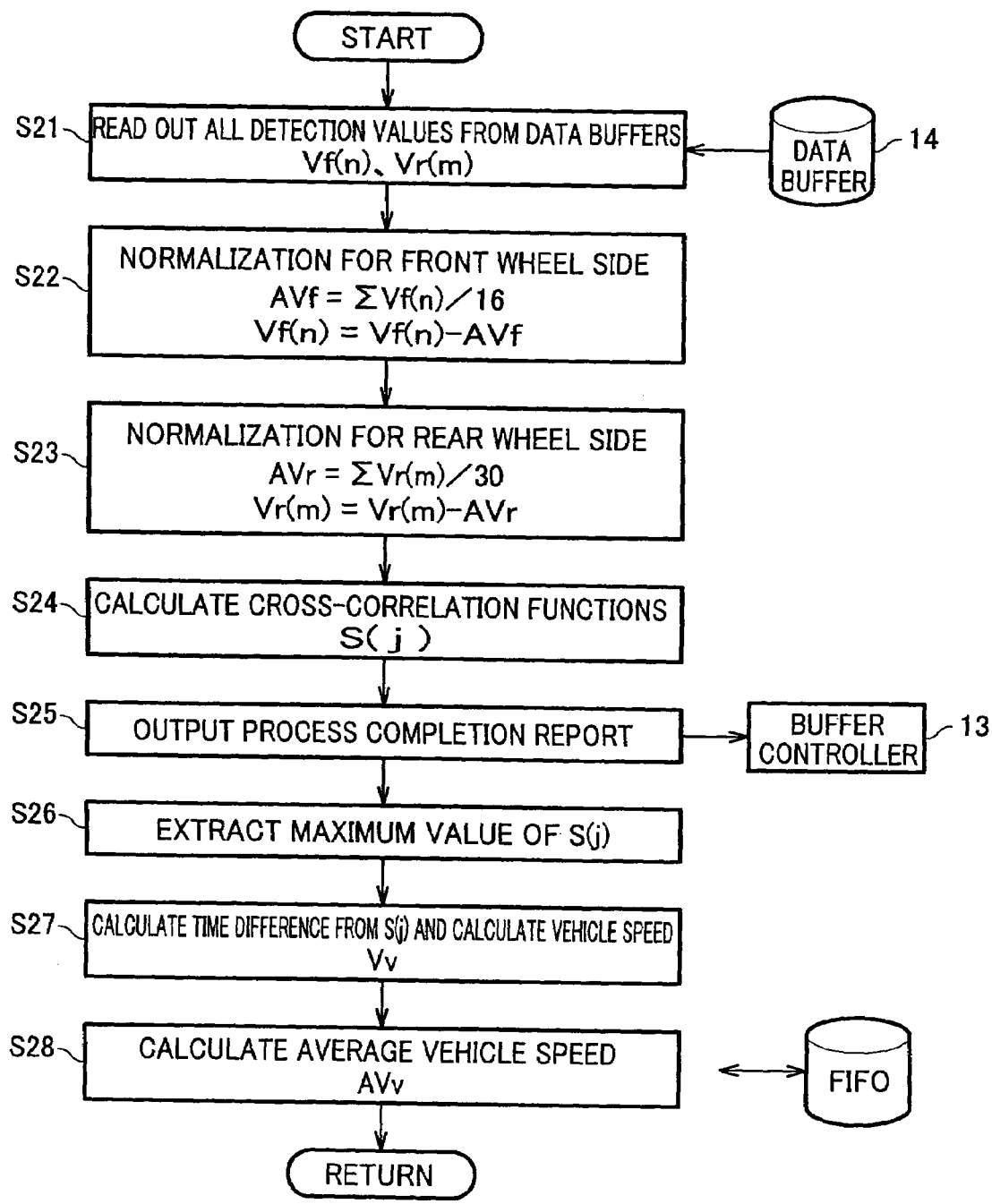
FIG. 6 is a flow chart showing operations for calculating average vehicle speed from the detection values stored in the data buffers.

When the certain number of array variables Vf(n), Vr(m) are stored in the data buffers 14f, 14r, as shown in the flow chart of FIG. 6, all the array variables Vf(n), Vr(m) are read out from the data buffers (S21). The normalization is then carried out for the front and rear wheel sides according to the previously described processes (S22, S23). During the normalization the equations (1) to (4) are used for calculations. BY the result of the normalization, the array variables Vf(n), Vr(m) are schematically shown, for example, by the graphs of FIGS. 7(a), 7(b). As previously described, in order to save the memory, the same variable identifiers are utilized before and after the normalization.

After the normalization is completed in steps S22, S23, the cross-correlation functions are calculated with the use of the equations (5) to (19) (S24). To avoid repetitions, the equations (5) to (19) are also given by the following equation (24).

$$S(j)=Vf(1)\cdot Vr(1+j)+Vf(2)\cdot Vr(2+j)+\ldots+Vf(16)\cdot Vr(16+j) \quad (24)$$

Upon calculating the cross-correlation functions and storing the result data in the array variables S(j) in step S24, the array variables Vf(n), Vr(m) are ready to store new data. The cross-correlation function calculation means 16 then outputs the process completion report to the buffer controller 13 in step S25. Thereby, new detection values Vf, Vr can be stored in the data buffer 14 as the array variables Vf(n), Vr(m) (see step S17 of FIG. 5).

In step S26, the maximum value is extracted from the array variable S(j) according to the equation (20) (S26). Thereafter, the index j of the maximum value S(j) is specified, and the time difference Δt is determined by way of substituting the index into the equation (21). The thus obtained time difference Δt and the wheel base WB that is previously stored in the vehicle speed measuring apparatus 1 are substituted into the equation (22) to calculate the vehicle speed Vv (S27). Herein, the calculation of the cross-correlation functions in step S24 and the extraction of the maximum value in step S26 are corresponding to a trial (i.e., pattern matching) for overlapping the two graphs (a) and (b) shown in FIGS. 7(a, 7(b), and the determination of the time difference Δt in step S27 corresponds to determining a phase difference between coincidence points of the two graphs.

Determination of the phase difference will be additionally described with reference to FIGS. 7(a), 7(b) and the equations (5) to (19).

For example, in the equation (5) where the phases are not overlapped in conformity (the patterns are different) at the front and rear wheel sides, the product such as obtained by multiplying Vf(2) by Vr(2) and the product such as obtained by multiplying Vf(3) by Vr(3) take negative values, and the product such as obtained by multiplying Vf(16) by Vr(16) takes a positive value. Accordingly, the sum S(1) of these variables is calculated by adding positive values and negative values.

Also in the equation (6) where the phases are not overlapped in conformity, the sum S(2) of the variables is calculated by adding positive values and negative values (see FIGS. 7(a) and 7(b).

However, in the equation (19) where the phases are overlapped in conformity (the patterns are coincident), the product obtained by multiplying Vf(1) by Vr(15) through the product obtained by multiplying Vf(16) by Vr(30) all take positive values. Therefore, the sum S(15) of these variables becomes the maximum value of S(j) where j is from 1 to 15.

For this reason, if the index j by which S(j) takes the maximum value can be found, it is possible to find out the phase difference based on this index j and the sampling interval (10 milliseconds in this preferred embodiment).

Next, the process in step S27 will be described in detail with the use of specific numbers.

If the array variable S(15) takes the maximum value (S26) the time difference Δt is 140 milliseconds (=(15−1)×10 milliseconds=0.14 seconds). In this instance, if the wheel base WB is 2.83 m, the vehicle speed Vv can be calculated as follows by the equation (22).

$$Vv = WB/\Delta t \times 3600/1000 \qquad (22)$$
$$= 2.83/0.14 \times 3.6$$
$$= 73 \ [\text{km/hr}]$$

The vehicle speed Vv calculated in step S27 is used to calculate the average vehicle speed AVv in step S28. To be more specific, when the vehicle speed Vv is calculated in step S27, the vehicle speed Vv is stored in FIFO (First In First Out memory) as an array variable Vv(k) The average vehicle speed AVv is then calculated by the equation (23) (calculation for the moving average). After the calculation, operation proceeds to RETURN for the continued processes. Step S21 through step S28 are there by repeated in order and the average vehicle speed AVv is calculated. Because FIFO initially stores no data in step S28, the average vehicle speed AVv is calculated in step S28 (by the average vehicle speed calculation means 19) in accordance with the data stored in FIFO. After all the data are stored in FIFO, the certain number of detection values Vf, Vr are stored in the data buffers 14f, 14r. All of these detection values Vf, Vr are then read out (S21), and the processes in steps S22 to S28 are executed to immediately calculate the average vehicle speed AVv.

The steps S11 to S23 in the flow charts correspond to the term "to feature extract" defined in the claims, and the steps S24 and S26 correspond to the term "to execute pattern matching".

As described above, the vehicle speed measuring apparatus 1 according to this preferred embodiment calculates (measures) the average vehicle speed based on a variation of detection values V of the wheel speed that are detected by the wheel speed sensors VS (i.e. ,vibrations from the road surface inputted through tires). According to this measurement, vehicle speed can be measured in a reliable manner regardless of a change in the tire diameter. This is different from the conventional measurement in which vehicle speed is measured based on wheel speed.

In principle, the vehicle speed Vv and the average vehicle speed AVv measured (calculated) according to the method of the preferred embodiment are not affected by the size of the tire, the amount of inflation pressure, etc. Therefore, the measured value can be utilized for various controls, detection for vehicle conditions, etc. For example, at the time of detecting air leakage of the tire inflation pressure (flat tire detection), by monitoring detection values of the wheel speed transmitted from four wheel speed sensors provided at respective wheels and by comparing the detection values of the wheel speed and the vehicle speed calculated as above, air leakage can be detected such that a wheel (tire) of which wheel speed is faster than the vehicle speed is considered as under-inflated. The above vehicle speed can also be utilized for a car navigation system, so that the position of the vehicle can be detected while the vehicle is running in a long tunnel. Further, the above vehicle speed can also be utilized to calculate the yaw rate. It is also possible to improve the accuracy of the obtained vehicle speed.

While the present invention has been described in detail with reference to a specific embodiment thereof, it will be apparent to one skilled in the art that various changes and modification may be made without departing from the scope of the claims.

For example, as previously described, vehicle speed may be measured by pattern matching between the rear wheel side and the front wheel side, during which are detected a change pattern at the rear wheel side and when the same change pattern appeared previously at the front wheel side. Further, it is not necessary to calculate the average vehicle speed. It is also possible to set a threshold value for S(j) that takes the maximum value, so that the vehicle speed Vv is calculated only when the S(j) becomes greater than a certain value (threshold value).

The final value of each process counter shows an example value, and it is not necessary to restrict the final value to this specific value. Although the sampling interval for detection values has been described as 10 milliseconds, the sampling interval may be shorter as the vehicle speed increases. The final value of the process counter may also vary in accordance with the sampling interval or vehicle speed.

Instead of excluding a variation due to lack of uniformity of the tire by means of software such as a digital filter, it is possible to exclude the lack of uniformity by means of hardware. Further, instead of employing a band pass filter, other filters such as a low-pass filter or high-pass filter may be employed. Processes of the vehicle speed measuring apparatus may be executed by means of hardware. Further, instead of providing wheel speed sensors VS at one wheel side Wf, Wr, the wheel speed sensors may be arranged diagonally or at both wheel sides.

Description has been given of the wheel speed sensor as an example of the vibration detection sensor. However, as long as it can detect vibration generated between the road surface and the vehicle (tires), various sensors such as a displacement meter, a weight meter, and a G sensor may be employed. For example, these sensors may be arranged at suspensions of the front and rear wheel sides so that vehicle speed can be measured (calculated) from the detection values.

Further, pattern matching is not limited to a specific example using cross-correlation functions.

What is claimed is:

1. A vehicle speed measuring apparatus for a vehicle comprising:
    vibration detection sensors for detecting vibrations from a road surface through tires, the vibration detection sensors being provided at front and rear wheel sides, respectively;
    an input section through which the vibration detection sensors input their detection values; and
    a processing unit for calculating vehicle speed of the vehicle based on a change pattern of the detection values inputted, wherein the processing unit operates in order:
    to feature extract a change pattern of the detection values for the respective front and rear wheel sides by excluding inherent tire influences on the detection values when the detection values are inputted through the input section;
    to execute pattern matching between the front and rear wheel sides on the basis of the feature extracted change patterns of the detection values;
    to obtain a time difference from a coincidence of the change patterns; and to calculate vehicle speed based on the time difference and a reference distance that is previously stored in the vehicle speed measuring apparatus.

2. A vehicle speed measuring apparatus for a vehicle according to claim 1, wherein the vibration detection sensors are wheel speed sensors.

3. A vehicle speed measuring apparatus for a vehicle according to claim 1, wherein the reference distance is a wheel base of the vehicle.

4. A vehicle speed measuring apparatus for a vehicle according to claim 2, wherein the reference distance is a wheel base of the vehicle.

5. A vehicle speed measuring apparatus for a vehicle according to claim 1, wherein the processing unit further operates to calculate an average vehicle speed over a period of time based on multiple calculated vehicle speeds.

6. A vehicle speed measuring apparatus for a vehicle according to claim 1, wherein the feature extraction operation of said processing unit varies based on vehicle speed.

7. A method of measuring vehicle speed for a vehicle comprising the steps of:
   detecting vibrations from a road surface through tires using vibration detection sensors provided at front and rear wheel sides of a vehicle, respectively;
   feature extracting a change pattern of detection values for the respective front and rear wheel sides as input from said vibration detection sensors by excluding inherent tire influences on the detection values when the detection values are inputted;
   executing pattern matching between the front and rear wheel sides based on the feature extracted change patterns of the detection values;
   obtaining a time difference from a coincidence of the change patterns; and
   calculating vehicle speed based on the time difference and a previously stored reference distance.

8. A method of measuring vehicle speed according to claim 7, wherein the vibration detection sensors are wheel speed sensors.

9. A method of measuring vehicle speed according to claim 7, wherein the reference distance is a wheel base of the vehicle.

10. A method of measuring vehicle speed according to claim 8, wherein the reference distance is a wheel base of the vehicle.

11. A method of measuring vehicle speed according to claim 7, further comprising the step of calculating an average vehicle speed over a period of time based on multiple calculated vehicle speeds.

12. A method of measuring vehicle speed according to claim 7, wherein said feature extraction step is varied based on vehicle speed.

13. A vehicle speed measuring apparatus for a vehicle comprising:
   vibration detection sensors for detecting vibrations from a road surface through tires, the vibration detection sensors being provided at front and rear wheel sides, respectively;
   an input section through which the vibration detection sensors input their detection values; and
   a processing unit for calculating vehicle speed of the vehicle based on a change pattern of the detection values inputted, wherein the processing unit comprises:
      a digital filter which receives detection values from the vibration detection sensors and provides filtered detection values which exclude inherent tire influences on the detection values,
      a data normalization unit which receives filtered detection values and normalizes the filtered detection values,
      a pattern matching unit which executes pattern matching between the front and rear wheel sides based on feature extracted change patterns of the normalized, filtered detection values,
      a time difference calculator which calculates a time difference from a coincidence of the change patterns, and
      a vehicle speed calculator which calculates vehicle speed based on to time difference and a reference distance that is previously stored in the vehicle speed measuring apparatus.

14. A vehicle speed measuring apparatus for a vehicle according to claim 13, wherein the processing unit further calculates an average vehicle speed over a period of time based on multiple calculated vehicle speeds.

15. A vehicle speed measuring apparatus for a vehicle according to claim 13, wherein the operation of the digital filter of said processing unit varies based on vehicle speed.

16. A vehicle speed measuring apparatus for a vehicle according to claim 13, wherein the data normalization unit normalizes the detection values by removing a vehicle speed component from the detection values.

17. A vehicle speed measuring apparatus for a vehicle according to claim 14, wherein the multiple calculated vehicle speeds are stored in a first-in-first-out memory so that values of the calculated vehicle speed stored for greater than a specified period of time are replaced with a new calculated vehicle speed value.

* * * * *